Jan. 19, 1965  A. S. PARKS  3,166,495
RATE CONTROL APPARATUS FOR CONTROLLING LIQUID FEEDS
Filed Oct. 31, 1958  5 Sheets-Sheet 2
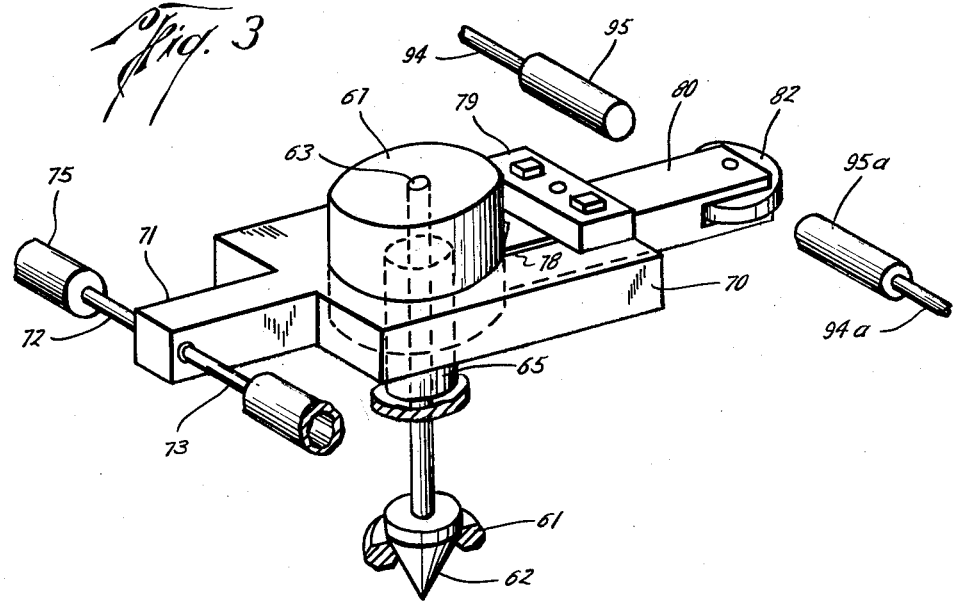
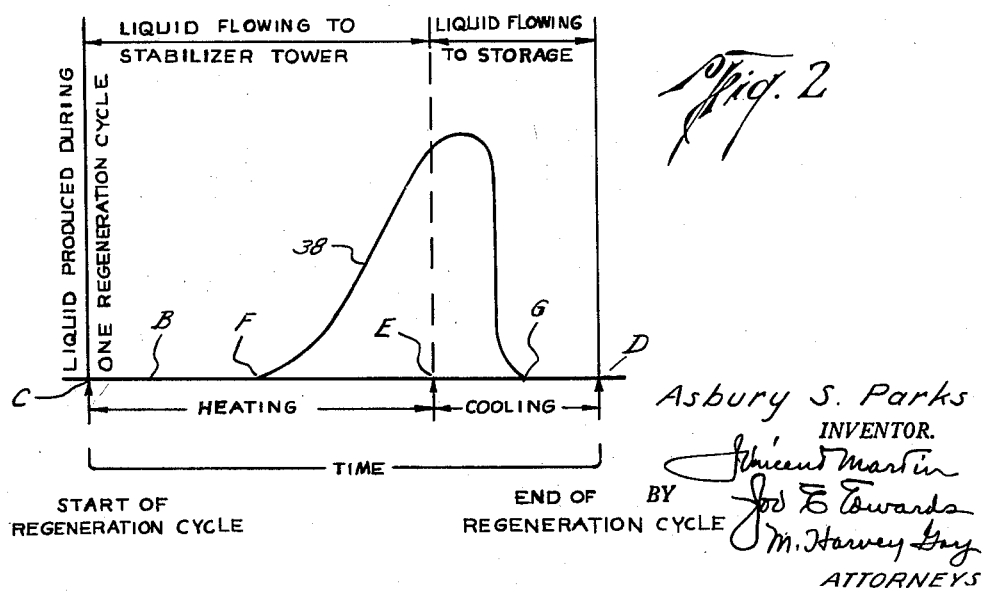
Asbury S. Parks
INVENTOR.
BY
ATTORNEYS Asbury S. Parks
INVENTOR.

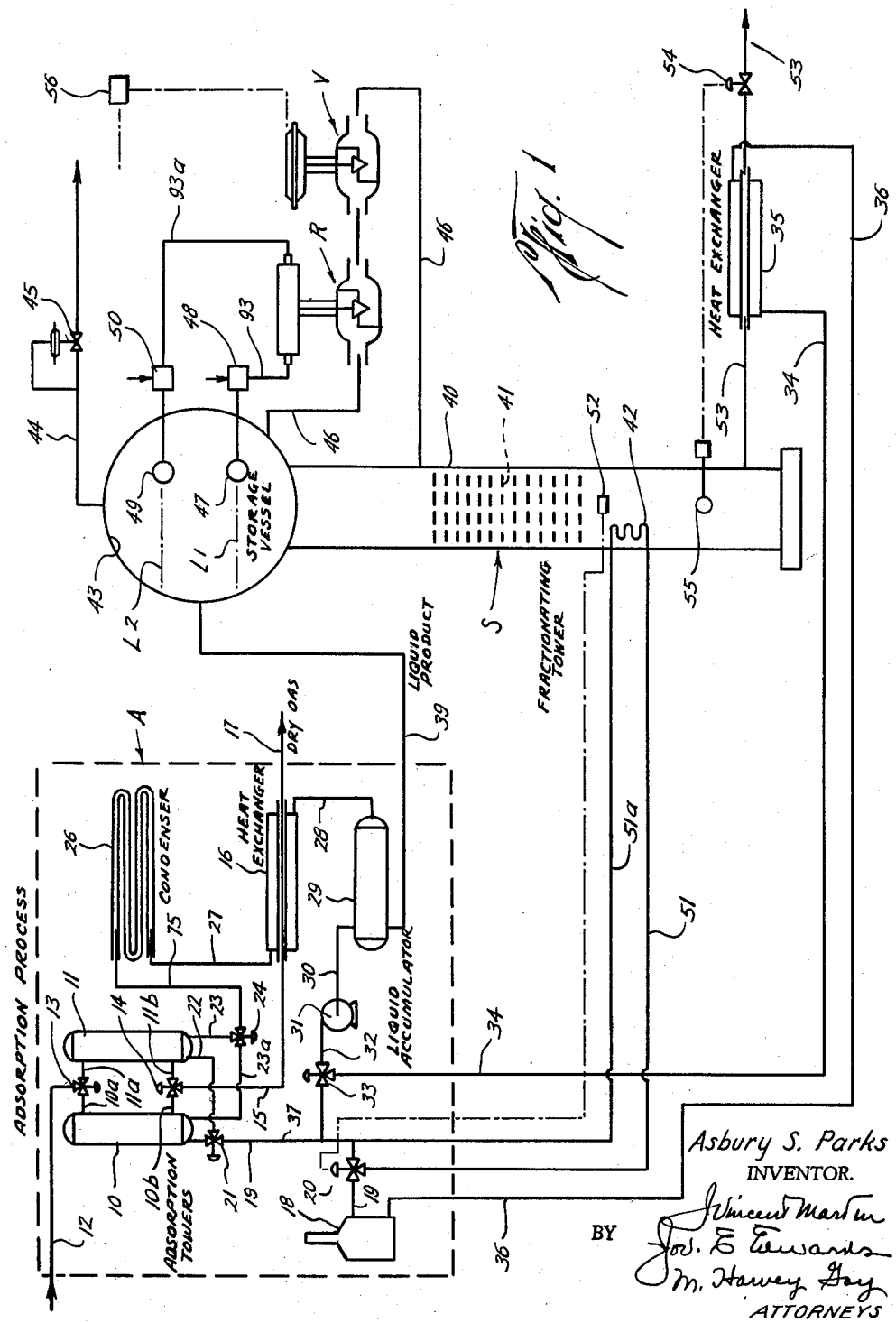

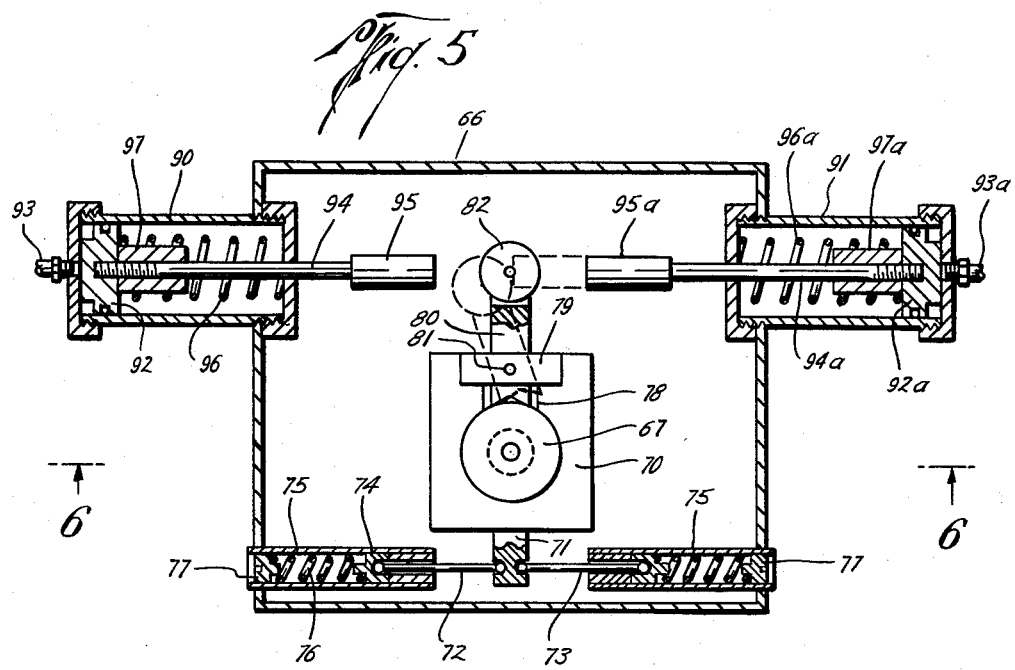
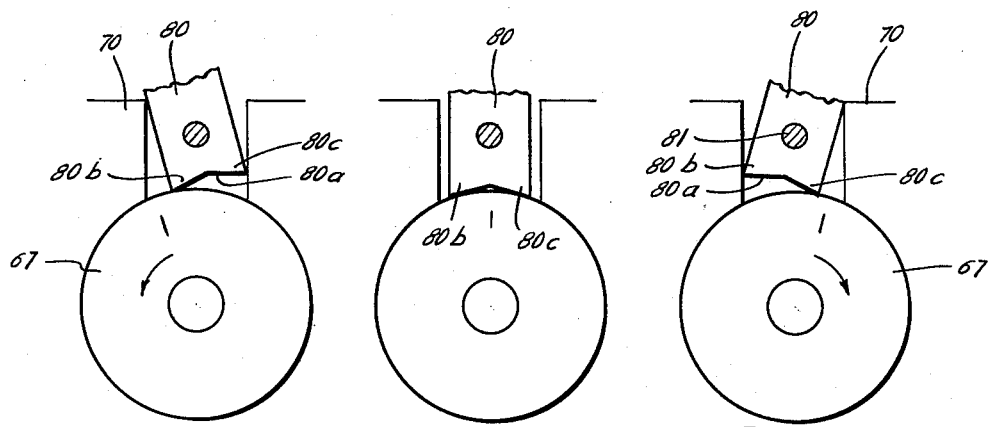

Jan. 19, 1965    A. S. PARKS    3,166,495
RATE CONTROL APPARATUS FOR CONTROLLING LIQUID FEEDS
Filed Oct. 31, 1958    5 Sheets-Sheet 5

Asbury S. Parks
INVENTOR.
BY
ATTORNEYS

United States Patent Office 3,166,495
Patented Jan. 19, 1965

3,166,495
RATE CONTROL APPARATUS FOR CONTROLLING
LIQUID FEEDS
Asbury S. Parks, Houston, Tex., assignor, by mesne assignments, to National Tank Company, Tulsa, Okla., a corporation of Nevada
Filed Oct. 31, 1958, Ser. No. 771,092
5 Claims. (Cl. 208—340)

This invention relates to new and useful improvements in rate control apparatus for controlling liquid feeds.

The invention relates particularly to rate control apparatus for use with a hydrocarbon recovery unit wherein hydrocarbon fractions are recovered from gas streams and finds advantageous use in controlling the rate of liquid feed produced in said recovery unit in its passage to a stabilizer tower which effects a stabilization of the recovered liquids.

There are in general commercial use various processes for hydrocarbon recovery from natural gas streams and one such process is disclosed in the co-pending application of Willard M. Dow, Serial No. 707,038, filed January 3, 1958, now abandoned. This process is known as an adsorption type process or unit and involves the use of dry desiccant multiple beds and the gas stream is directed alternately through a pair of adsorption towers or vessels, with one tower on an absorbing cycle and the other tower on a regenerating cycle during each period of operation. During each period of operation, each bed is first saturated by passing the gas stream through the desiccant bed, the bed is thereafter heated to vaporize the adsorbed materials and then the bed is cooled to prepare it for the next succeeding cycle.

Regeneration of the bed is accomplished during the heating of said bed and this is effected by directing a heated stream of gas through said bed to vaporize the fractions which have been removed from the main gas stream during the saturating period. The heated regeneration gas, which has picked up the fractions, is then subsequently cooled and the fractions removed as liquids. During the latter part of the regeneration cycle, the heater may be completely shut off and only cool regeneration gas circulated.

In as much as the process is one of a cyclic nature, the period of liquid condensation from the regeneration gas stream is only a small part of the total cycle period which includes saturating, heating and cooling phases. Where it is desired to subsequently pass the liquid produced by the adsorption type process to stabilization, the problem of properly controlling the feed of the condensed liquid to the stabilizer in accordance with the periods when heat is available is presented. Usually, the only source of heat for a unit of this type is the heater employed to heat the regeneration gas stream and, therefore, this source of heat must be used to heat the lower portion of the stabilizer column. However, because the liquid production period does not coincide with the operation of the heater which supplies heat for regeneration and stabilization, it is not practical to operate the stabilizer only during production period.

The above referred to Dow application illustrates the use of a stabilizer tower and recognizes the problem of controlling the rate of feed of liquid produced by an adsorption type recovery unit in accordance with liquid production. The present invention is directed to an improved and practical control apparatus for controlling the rate of liquid feed to a stabilizer tower or some other unit.

It is the main object of this invention to provide an improved control apparatus which will properly control the rate of liquid flowing to a stabilizer tower and which is so arranged that the stabilizer tower may be heated by a portion of the regeneration gas stream which is being circulated during the heating phase of the regeneration period of the desiccant towers, whereby the same heat which is available to heat the regeneration gas is employed to operate the stabilizing tower.

Another object is to provide a control apparatus in which the liquid produced by the hydrocarbon recovery unit is actually stored or retained in a suitable vessel, together with means for feeding or directing this liquid to the stabilizer tower at the time that heat is available to operate said stabilizing tower.

Still another object is to provide a control apparatus in which the rate of feed to the stabilizer tower is controlled in accordance with the volume of liquid present in the storage vessel whereby any increase in liquid production by the hydrocarbon recovery unit permits an increased volume to be handled by the stabilizer and conversely any decrease in liquid production directs a lesser volume of liquid to said stabilizer, whereby a substantially continuous functioning of the apparatus may be carried out.

A particular object is to provide an improved control apparatus of the character described which includes an adjustable rate controller valve which is effectively adjusted to proper positions by pressure pulse application to actuating elements, whereby the pressure control device may be simplified and efficient operation assured.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a flow diagram of a hydrocarbon recovery apparatus and illustrates a stabilizer tower for receiving the liquid produced by said apparatus, said section also illustrates diagrammatically the control apparatus for controlling the rate of feed of liquid to said tower;

FIGURE 2 is a graph or chart illustrating the relationship between the regenerating cycle of the adsorption apparatus to the liquid extracted or produced and also showing the relationship of the operation of the stabilizer to the operation of said adsorption apparatus;

FIGURE 3 is a partial isometric view of the control apparatus for controlling the position of the rate controller valve;

FIGURE 5 is a horizontal cross-sectional view taken on the line 5—5 of FIGURE 4;

FIGURES 7, 8 and 9 are enlarged exaggerated views illustrating the co-action between the toggle actuating arm and the valve adjusting element.

Figure 4:
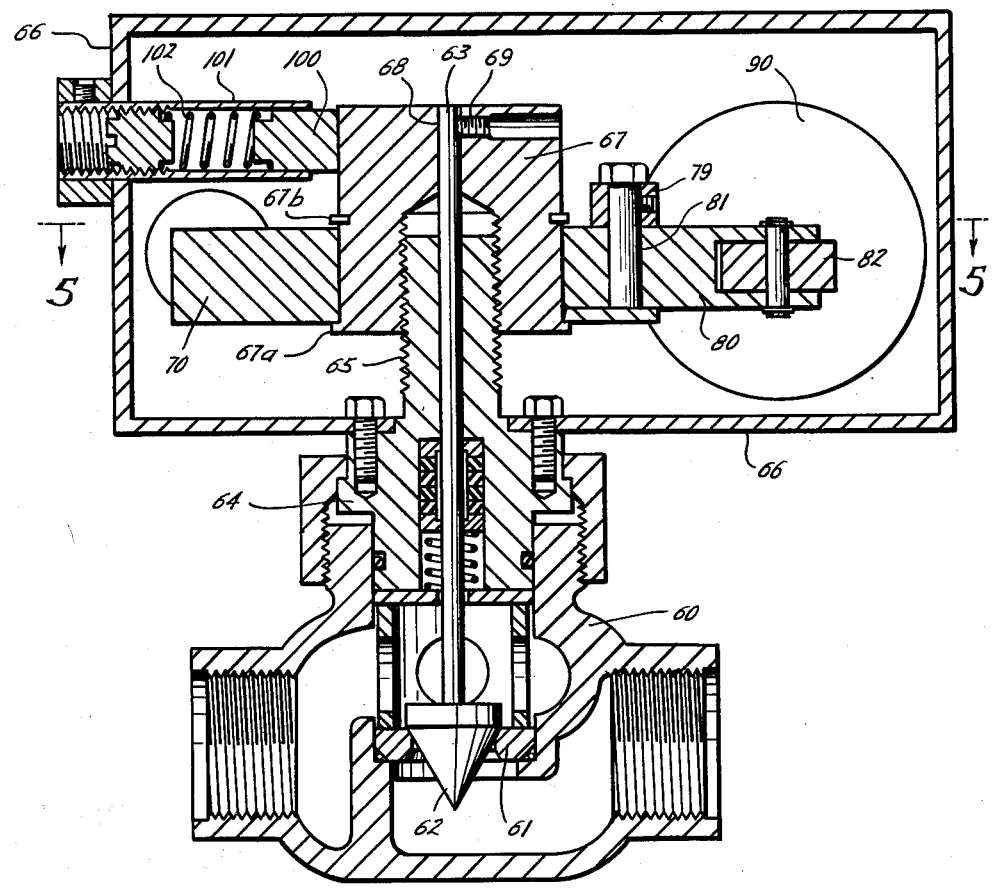
FIGURE 4 is a transverse vertical sectional view taken through the rate controller valve and its operating mechanism.
Figure 6:
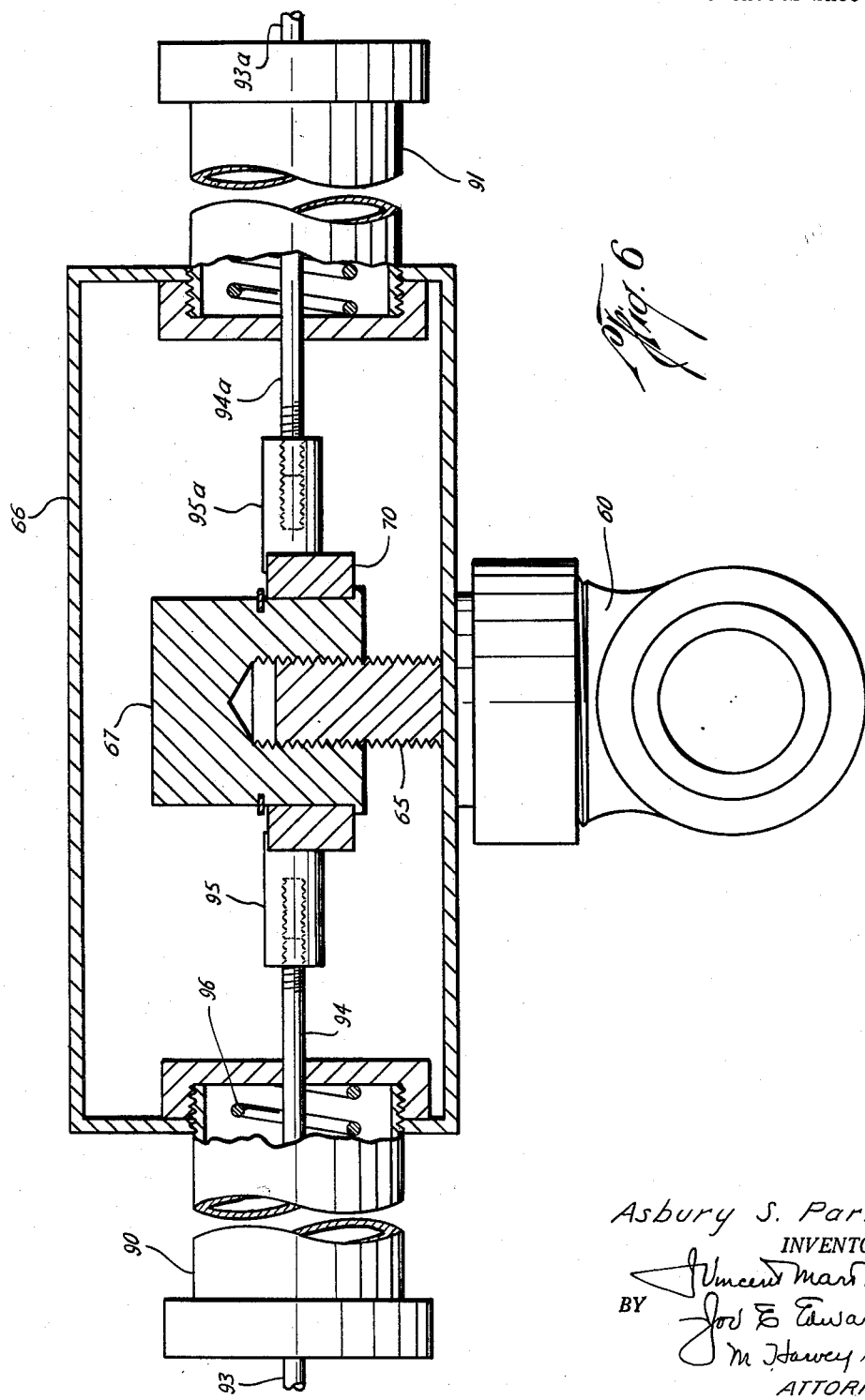
FIGURE 6 is a vertical sectional view taken on the line 6—6 of FIGURE 5.

In the drawings, the letter A designates an adsorption type apparatus for extracting hydrocarbon liquids from a gas stream. Although the apparatus may be of any desired arrangement, it is preferable to employ the particular apparatus disclosed in the above-mentioned application of Willard M. Dow, Serial No. 707,038, filed January 3, 1958.

The apparatus is schematically illustrated and includes a pair of adsorption vessels or towers 10 and 11. Each tower contains a bed of suitable adsorbing material or desiccant and the flow of the main gas stream is directed through the bed of one tower while a regenerating gas is directed through the other tower; after each cycle, flows through the towers are switched so that said towers are alternately on an adsorbing cycle and a regenerating cycle.

Briefly describing the process of the apparatus A, a gas stream inlet 12 extends to a three-way valve 13 and from this valve flow is either through a line 10a or line 11a to one or the other of the towers 10 or 11. Assuming tower 10 to be on an adsorbing cycle, with tower 11 being regenerated, valve 13 is in a position to direct flow from the inlet line 12, through line 10a and into tower 10 so that the main gas stream is passed through the bed of adsorbent material within said tower. As is well known, the adsorbent material functions to adsorb the liquids, including the desirable hydrocarbon constituents, and the gas stream is directed from the lower end of tower 10 through line 10b. From this point a three-way valve 14 directs the gas stream through an outlet conductor 15, then through a heat exchanger 16 and finally outwardly through a discharge line 17. The adsorbent material within the towers has an adsorption efficiency for the lighter hydrocarbons such as propane, butane and pentane but it will also function to pick up some of the extremely lighter ends such as the methanes and ethanes.

When flow is switched to place tower 11 on an adsorbing cycle, the valves 13 and 14 are actuated to direct the gas stream from inlet line 12 through line 11a into tower 11. From tower 11 the gas stream flows through line 11b, valve 14 and then through outlet line 15, heat exchanger 16 and discharge line 17.

With the tower 10 on the adsorbing cycle, tower 11 is on the regeneration cycle and during this period a regeneration gas stream is directed through tower 11. The regeneration gas stream is utilized to pick up the liquid fractions which have been adsorbed by the bed of adsorbent material on the preceding adsorption cycle and thereafter such liquid fractions are condensed and removed from the unit as a liquid product. The regeneration gas stream flows within a separate circuit or system which includes a heater 18; from the heater the hot regeneration gas stream is directed through a line 19, past a control valve 20 and then through a three-way valve 21 which directs the regeneration gas to either tower 10 or tower 11.

With tower 11 on the regeneration cycle, a three-way valve 21 is in a position to conduct the regeneration gas stream from line 19 through a line 22 to tower 11. After passing through the bed of adsorbing material during which the hot regeneration gas picks up the liquid fractions, said regeneration gas escapes from tower 11 through line 23 which connects with a three-way valve 24. This valve also has connection with a line 23a extending from the tower 10 whereby when tower 10 is on a regeneration cycle, the regeneration gas may pass to valve 24. From valve 24 the regeneration gas stream flows through a conductor 25 to a heat exchanger 26 which may be of the atmospheric type and which cools the gas stream to encourage condensation of the liquid fractions. From the condenser-cooler 26 the gas flows through line 27 to heat exchanger 16 where it is passed in heat exchange relationship with the main gas stream flowing to the discharge line 17 to thereby effect the further cooling of said regeneration gas.

From the heat exchanger 16 the regeneration gas is directed through conductor 28 to a liquid accumulator 29 wherein the liquids are separated from said gas. The regeneration gas leaves the accumulator 29 through line 30 and a pump 31 pumps said gas through a discharge conductor 32 past a three-way valve 33 and into a line 34. The line 34 extends to a heat exchanger 35, the purposes of which will be hereinafter described, and from the heat exchanger the regeneration gas is conducted through conductor 36 back to the heater 18. It is thus apparent that when the three-way valve 33 is in one positon connecting line 32 with line 34, the regeneration gas is circultaed within a system which starts with the heater and includes the tower 11, condenser-cooler 26, heat exchanger 16, accumulator 29 and heat exchanger 35, after which the gas flows back to the heater. During the first portion of the regenerating cycle the regeneration gas flows in this manner.

During the latter portion of each regeneration cycle, the regeneration gas continues to circulate through the tower 11 but no heat is applied to said gas during said latter portion of the cycle. For this purpose a by-pass line 37 connects with the three-way valve 33 and upon operation of the valve 33 the discharge conductor 32 extending from the pump 31 is directly connected with the by-pass line 37. This by-pass line has direct connection with the conductor 19 which leads to the towers by means of the tree-way valve 21.

When the valves 13 and 14 are switched to switch flow of the main gas stream from tower 10 to tower 11, the valves 21 and 24 are also actuated and this directs the regeneration gas stream to tower 10 to place that tower on the regeneration cycle. As has been described, the first portion of the regeneration cycle is carried out with the regeneration gas being heated and with the tree-way control valve 33 in a position connecting the discharge of the pump 31 with the line or conductor 34. During the latter portion of the regeneration cycle, the valve 33 is actuated to cause a by-pass of the regeneration gas stream around the heater 18 whereby only cool regeneration gas is circulated through the tower during the latter portion of said regeneration cycle.

This operation of the apparatus results in an intermittent production of liquids or liquid product which production is not co-extensive with the actual heating phase of the regeneration cycle. FIGURE 2 illustrates the relationship between the regeneration cycle and the liquid production. As shown in this figure, a complete regeneration cycle, that is, from the time that the switch-over valves 13, 14, 21 and 24 are first actuated to direct the regeneration gas to one tower until the cycle is complete, is shown. The horizontal line B between the points C and D is representative of the total time of one complete regeneration cycle. At the start C of the regeneration cycle, valve 33 is in a position connecting the discharge 32 of the pump with the conductor 34 and the regeneration gas is circulated through the heater 18 wherein heat is applied. This is the heating phase or portion of the regeneration cycle which extends in point of time from the starting point C of the period to the point designated E on the horizontal line B. At point E in the time cycle, valve 33 operates to direct the regeneration gas through the by-pass line 37 so as to by-pass the heater 18 and therefore during the time represented between the points E and D on line B of FIGURE 2, regeneration gas is being circulated but no heat is being applied.

At the start C of the regeneration cycle there is no liquid being produced in accumulator 29. However, as the regeneration gas stream continues to circulate through its respective tower condensation and production of liquid commences at approximately the time indicated by the point F in FIGURE 2. Liquid production occurs in approximately the manner shown by line 38 of FIGURE 2 and maximum liquid production is obtained just following the time that the heating of the regeneration gas stream is stopped which is between points E and D. During the first portion of the cooling period, additional liquid is accumulated in the vessel 29 and liquid production stops at approximately the point G as indicated on line B of FIGURE 2. Thereafter the circulation of the cool regeneration has functioned to cool the bed of adsorption material in preparation for the next succeeding adsorbing cycle.

From the foregoing it will be seen that the liquid produced by the adsorption type process and apparatus is extracted from the main gas stream and is accumulated within the accumulator 29 in an intermittent manner. Its production and accumulation within the vessel 29 is not co-extensive with the actual application of heat to the regeneration gas stream. If the liquid product is to be taken to a stabilizer, then some method of control of the feed to the stabilizer must be provided particularly where it is desired to utilize a portion of the heated regeneration gas as the heat for the stabilizer.

As shown in FIGURE 1 the liquids which are produced and accumulated in the vessel or accumulator 29 are discharged therefrom through a line 39 which extends to a stabilizer unit generally indicated by the letter S. The unit S comprises the usual fractionating tower 40 which includes usual bubble trays or other fractionating plates 41 and a heating coil or other heating means 42 in the lower portion thereof. Mounted upon the upper end of the fractionating tower 40 is an enlarged receiving or storage vessel 43 which may be of spherical form and the liquids which are produced in the adsorption apparatus A are conducted through the discharge line 39 and into the interior of said storage vessel. The receiving vessel is preferably of a volume which is greater than the volume of liquid produced upon each operation of the recovery unit A. It is also desirable that the receiving vessel 43 and fractionating tower 40 be operated at a substantially lower pressure than the adsorption unit A and any vapors which may be flashed by reason of introduction of the extracted liquid product into vessel 43 may be conducted therefrom through an outlet line 44 controlled by a suitable valve 45.

The liquid from the storage vessel 43 is conducted in a controlled manner, as will be hereinafter described, through a connecting line 46 which line is connected with the upper portion of the fractionating tower 40 above the fractionating section. A valve V, which controls flow through the line 46, is connected in said line and for controlling the rate of flow through the line 46 when valve V is open, a rate controller valve R is also mounted in said line. As will be explained, the position of the valve element of the rate controller valve R is controlled by the liquid level within the storage vessel 43.

As schematically shown in FIGURE 1, a lower float assembly 47 within the storage vessel controls a pilot pressure unit 48 to apply a pressure to the rate controller valve R. An upper float assembly 49 controlling a pilot pressure unit 50 is also disposed within the storage vessel or chamber 43. At any time that the liquid level falls below the line $L_1$, the lower float assembly 47 will, through its pilot unit 48, apply a pressure to the rate controller valve R, whereby said valve is moved closer to its seat to restrict or reduce flow through line 46 which connects the vessel 43 with the fractionating tower. If the level of liquid within the vessel 43 rises to the level $L_2$, the upper float assembly 49 is actuated and through its pilot unit 50 applies pressure to the rate controller valve in a direction which will cause the rate controller valve to open wider and allow a greater flow through line 46. Thus, by means of the two float assemblies it is possible to assure that the rate of flow of liquid from the vessel 43 to the fractionating tower is automatically varied at any time that the level of the liquid in the vessel is either below the level $L_1$ or above the level $L_2$.

For providing the required heat to the heater or coil 42 in the lower portion of the tower 40, a line 51 extends from the valve 20 which is disposed at the outlet side of the heater 18. The valve 20 is adjustable and may direct a portion of the heated regenerating gas, which is flowing from the heater, through line 51 to the heating coil 42. The valve 20 may be diaphragm-operated and may have connection with a temperature responsive element 52 mounted in the lower portion of the fractionating tower, whereby the position of the valve 20 is controlled by the temperature in said tower; in this way, the valve 20 would be automatically adjusted to direct more or less regeneration gas from the line 19 extending to the heater through valve 20 and then through the line 51 extending to the heating coil 42. The other end of the heating coil has a return line 51a extending therefrom, and this line has connection to the line 19 downstream of the valve 20. It is obvious that by controlling the position of valve 20 with the temperature responsive element 52, more or less heated gas is passed through the heating coil. In this manner, proper control of temperature in the lower end of the fractionating tower is maintained.

The liquids from the lower end of the fractionating tower are discharged through an outlet 53 which extends through the heat exchanger 35, whereby the discharging liquids are passed in heat exchange relationship with the hot regeneration gas. The line 53 may have a control valve 54 which is controlled in the usual manner by a suitable liquid level unit 59 mounted within the lower portion of the tower 40.

As has been noted, the liquid produced in the accumulator 29 is actually produced during a part of the heating phase and a part of the cooling phase of the regeneration cycle. However, the regeneration gas is being heated only during the heating phase, and this is the only time that hot regeneration gas is available to heat the coil 42 or heating element of the stabilizer. With the arrangement shown in FIGURE 1, the volume of the storage vessel 43 between the levels $L_1$ and $L_2$ is greater than the volume which is produced upon each cycle of the adsorption apparatus A. The float assemblies 47 and 49 maintain the limits of the level of liquid within the storage vessel so that liquid is always available for passage to the fractionating tower 40.

The valve V which merely opens or closes to either permit or shut off flow through line 46 is actuated by a suitable control 56, which control also operates the heater 18. In other words, when the heater 18 is turned on to apply heat to the regeneration gas and the start of the heating phase of the regeneration cycle occurs, the valve V is opened to permit a flow of liquid from the storage vessel to the fractionating tower. At this time and throughout the heating phase of the regeneration cycle, a portion of the hot regeneration gas is conducted to the heating coil 42 to apply the required heat to the tower. The rate controller valve R has been manually adjusted to approximate the amount of liquid which will flow through line 46 to the tower 40 during each fractionating period. Therefore, so long as the liquid level in the vessel 43 remains between the levels $L_1$ and $L_2$, the float assemblies 47 and 49 are not actuated and there is a constant flow of liquid from the vessel to the fractionating tower. Upon the completion of the heating phase of the regeneration cycle, the heater 18 is shut off by means of the control 56, and simultaneously therewith the valve V is closed to prevent any further flow of liquids to the fractionating tower. This completes the fractionating period.

However, as shown by the chart FIGURE 2, liquid product continues to be produced by the adsorption unit A and continues to flow into the storage vessel 43, even after the heater has been shut off. This liquid is merely stored in vessel 43 and will remain therein until the next heating phase of the subsequent regeneration cycle, at which time valve V is again opened, heat is applied to the coil of the fractionating tower 42, and another fractionating period is commenced.

During the fractionating period, the flow from vessel 43 to the fractionating tower is in accordance with the manual adjustment of the rate controller valve R. However, if the liquid level in the vessel 43 falls below the level $L_1$, which means that there is a possibility of conducting all of the liquid from the storage vessel 43, the lower float assembly 47 will be actuated to apply pressure through its control unit 48 to the rate controller valve. As will be explained, this will result in an adjustment of the valve element of the rate controller valve R to reduce the flow through line 46. Similarly, if the liquid entering the vessel 43 builds up beyond the liquid level $L_2$ during a fractionating period, then float assembly 49 will operate its control unit 50 to apply pressure to the rate controller valve R, thereby adjusting the valve element of the rate controller valve to increase the volume of liquid flowing through line 46 to the tower 40. By providing the float assemblies and controlling the valve R in accordance with liquid level, it is assured that there is sufficient liquid at all times in the storage vessel to feed the fractionating tower during each fractionating period. Also, even though the liquid production is intermittent or at a different rate during each adsorption cycle of the apparatus A, the variations in liquid production are taken care of by the volume of the vessel 43.

From the foregoing it will be seen that the fractionating period occurs during the time that hot regeneration gas is available, that is, during the heating phase of the regeneration cycle. The liquid product which is produced by the adsorption apparatus and which is variable is merely conducted into the storage vessel 43, and, by means of the rate controller, the liquid is fed to the fractionating tower during the fractionating period in proper volume with relationship to the amount of liquid available. When the heating phase of the regeneration cycle is complete, the heater shuts off and at the same time the valve V in line 46 is closed so that during the cooling phase of the regeneration cycle the fractionating tower is not operating. During this time, the liquid product being produced is merely stored in the vessel 43 so that it will be available for the next fractionating period.

The construction of the rate controller valve R is illustrated in FIGURES 3-9, and, referring specifically to FIGURE 4, said valve includes a valve body 60 having a valve seat 61 therein. This valve element is provided with an upwardly extending valve rod 63 which projects upwardly through a suitable packing gland 64 secured to the upper end of the valve body 60. The valve body 60 is of course adapted to be connected in the line 46 which connects the storage vessel 43 with the fractionating tower 40.

Extending upwardly from the annular gland element 64 is a threaded stem 65, and this stem projects upwardly into a casing 66, which may be suitably mounted on the upper end of the valve body. A circular hub or actuating collar 67 is threaded onto the stem 65, and the upper end of the valve rod 63 extends within a bore 68 of the hub and is secured therein by a suitable set screw 69. With this arrangement, a rotation of the hub or actuating collar 67 will cause the same to travel upwardly or downwardly on the threaded stem 65; this will result in a movement of the valve rod 63 and valve element 62. By adjusting the position of the hub or actuating collar 67 on the stem 65, the position of the valve element 62 with respect to its seat 61 may be effected.

For actuating or imparting rotation to the hub or actuating collar 67, a drive member 70 is provided. This drive member is in the form of a block (FIGURE 3) which is journalled about the hub or actuating collar 67; the block may be supported upon a flange 67a provided at the lower end of the hub or collar 67 and may be retained in place by a suitable snap ring 67b, whereby the block is rotatable about the hub. For maintaining the block 70 in a centered position with respect to the hub or collar 67, said block is formed with an extension arm 71 which projects from one side thereof. The arm 71 is engaged by centering rods 72 and 73, which rods are retained by keepers 74 located within cylinders 75. A spring 76 is confined in each cylinder 75 and acts against the keeper 74 to urge the centering rods 72 and 73 against the arm 71 of block 70. An adjusting plug 77 is threaded into the outer end of each cylinder 75 and provides for an adjustment of the tension which may be applied to the centering springs 76. Since the strength of the springs 76 is substantially identical, it will be obvious that the rods 72 and 73 engaging the arm 71 will function to constantly center or maintain the block in what may be referred to as a neutral position with respect to the hub or actuating collar 67.

For imparting a rotative movement to the block 70 and also to the hub or actuating collar 67 in order to effect an adjustment of the valve element 62, the actuating block is formed with a slot 78 on the side opposite the centering arm 71. A support bar 79 spans the slot and a toggle actuating arm 80 has its inner end extending into the slot 78, said arm being pivoted to swing on a pivot pin 81. The outer end of the toggle arm is formed with a roller 82, and it will be evident that a movement of the outer end of the arm 80 will cause a swinging or pivoting of said arm on its pivot pin 81.

The inner end of the toggle actuating arm 80 is adjacent the periphery of the hub or actuating collar 67, and the contour of this inner end is illustrated in FIGURES 7-9. As shown, the inner end of the arm 80 is provided with a recessed portion 80a, whereby its outer edges form cam surfaces as indicated at 80b and 80c. Since the toggle arm 80 is attached to the drive block 70, a swinging movement of the outer end of the arm 80 will cause the engagement of either one or the other of the cam surfaces 80b or 80c of said arm with the periphery of the hub 67 with the result that continued movement of the outer end of the toggle arm will result in a rotative movement of the block 70. Such a rotative movement of the block 70 will be transmitted to the hub or actuating collar so that said collar is rotated with respect to the stem 65 upon which it is threaded. Obviously, as the hub or collar rotates with respect to the stem 65, the co-action between the threads will result in the collar and the valve rod 63 which is attached thereto undergoing a vertical adjustment to thereby adjust the valve element 62 with respect to its seat 61.

In FIGURE 8, the inner end of the toggle arm 80 is shown in its neutral or centered position, at which time there is no driving connection between the drive block 70, which carries the arm, and the hub or actuating collar 67. When the toggle arm 80 is moved in one direction, as shown in FIGURE 7, its cam edge 80b sets up the driving connection between the drive block 70 and the hub and will cause a counter-clockwise rotation of the hub 67. When the toggle arm is swung in an opposite direction, as illustrated in FIGURE 9, its came edge 80c engages the periphery of the hub or collar 67, and thereafter a clockwise rotation will be imparted to said hub.

For applying the movement to the outer end of the toggle arm 80 and to thereby adjust the valve element 62, a pair of operating cylinders 90 and 91 are provided. The cylinder 91 has a piston 92 therein, and the outer end of the cylinder is connected through pressure line 93 with the pressure control unit 48 of the lower float assembly 47 in the storage vessel 43. A piston rod 94 extends from piston 92 and projects into the casing 66, and the outer end of said piston rod carries an adjustable contact member 95. A coil spring 96 within the cylinder 90 normally maintains the piston 92 in the position shown in FIGURE 5, with its contact member 95 retracted or moved away from the end of the toggle arm 80. When pressure is applied to the piston 92, the rod 94 and its contact member 95 are moved forwardly and engage the roller 82 in the end of the toggle arm 80 to effect a swinging movement of the outer end of the arm. The inner end of said arm would be swung in the manner shown in FIGURE 9, so that upon operation of the piston 92 the hub would be moved in a clockwise direction. A stop sleeve 97 is threaded onto the piston rod and is adapted to abut the inner end of the piston 90 to set the limit of piston travel.

It is desirable to actuate the piston 92 with a single-pressure pulse whereby the piston rod 94 may undergo full travel and then be retracted. In order to prevent the hub or actuating collar 67 from returning after it has been moved in the clockwise direction due to the co-action between the piston rod 94 and toggle arm 80, a friction shoe 100 (FIGURE 4) is provided. This shoe is housed within the end of a cylinder 101 which is suitably mounted in the wall of the casing 66. A spring 102 is housed within the cylinder and constantly urges the shoe 100 into firm frictional contact with the outer periphery of the hub or actuating collar 67.

The friction shoe 100 is in constant engagement with the outer periphery of the collar or hub 67 and serves to maintain the valve element 62 in its adjusted position. As a pressure pulse is introduced into the cylinder 90 behind piston 92, the piston rod 94 and its contact member undergo a longitudinal movement which causes engagement of the contact member with the roller of the toggle arm 80. As explained, this movement will initially set up a driving connection between the drive block 70 and the hub, and therefore the rotative movement is applied to the hub to adjust the valve. Upon the release of pressure, the spring 96 will return the piston to its initial position and the centering springs 75 acting on the centering rods 72 and 73 will return the drive block to its neutral position as shown in full lines in FIGURE 5. However, because of the engagement of the friction shoe 100 with the periphery of the hub, said hub will remain in its adjusted position, allowing return of the other parts to their original positions. It is thus obvious that it would be possible for the piston 92 to be actuated in succession to constantly rotate the hub in a clockwise direction, and this could occur without any operation of the opposite piston assembly. Each time that the rod 94 is actuated a predetermined rotation would be imparted to the hub to effect the desired adjustment of the valve. It is, of course, evident that the adjustment of the contact member 95 will control the swinging movement of arm 80 and thereby control the amount of rotation of the hub upon each actuation of the piston rod.

The cylinder 91 and its associate parts are constructed in the same manner as the cylinder 90. This assembly includes the piston 92a which is connected with the piston rod 94a, the latter having the adjustable contact member 95a at its outer end. A coil spring 96a and limit or stop sleeve 97a are provided within the cylinder 91 to control the movement of the piston and to return said piston to retracted position when pressure is relieved. The piston 91 is connected through a line 93a with the pressure control unit 50 which is actuated by the upper float assembly 49 in the storage vessel 43. The operation of the rate control valve R is believed evident from the foregoing. The rotatable hub or collar 67 is threaded upon the stem 65 and is attached directly to the valve rod 63 of the valve element 62. The drive block 70 which surrounds the hub or actuating collar 67 is normally maintained in a neutral position, as shown in full lines in FIGURE 5, by the centering rods 72 and 73. Initially the hub will be manually adjusted on the stem to open the valve element the desired amount in accordance with the normally expected liquid production, which liquid is to be conducted through the line 46 to the fractionating tower 40.

In the event that the level of the liquid in the storage vessel 43 falls below the level $L_1$ during the time that fractionation is being carried out, the float assembly 47 will operate the pilot pressure unit 48 and will direct pressure through the line 93 to the piston 92 of control cylinder 90. This will move the contact element 95 of piston rod 94 into contact with the outer end of the toggle arm 80, moving the same first to the position shown in FIGURE 9 and thereafter causing a rotative movement of the hub or collar 67. Such movement would be in a clockwise direction and would cause the valve 62 to move closer to its seat and thereby restrict the flow through the line 46.

In the event that the liquid level in the storage vessel 43 rises above the level $L_2$, the upper float assembly 49 operating its pilot control unit 50 would direct pressure through line 93a and cause an inward movement of the piston rod 94a, whereby its contact member 95a would engage the outer end of the toggle arm 80 and swing said toggle arm in the manner shown in FIGURE 7. As soon as the toggle arm swung sufficiently to set up the connection between the drive block 70 and the hub 67, continued application of pressure would rotate the hub in a counter-clockwise direction, with the result that the valve 62 would be moved upwardly away from its seat to permit a greater volume of flow through the line 46. The operation of the control is automatic in accordance with the liquid levels in the vessel 43, and the rate controller valve R is automatically adjusted to permit the proper volume of liquid to flow to the fractionator during the fractionating period.

The particular control apparatus disclosed provides a most efficient method of directing or controlling the rate of liquid feed to the fractionating tower during the fractionating period, which is at a time that the heating of the regeneration gas is occurring. The device is not dependent upon the particular rate of liquid production, because such rate may be varied upon each cycle of operation of the adsorption unit A. The apparatus makes provision for storage of the liquid in the vessel 43 and then provides an accurate control of feeding the stored liquid to the fractionator at the time the fractionating operation is being carried out. It might be noted that many times the heat which is used for the heater 18 in an adsorption unit of this type is the only heat source which is available for fractionation, and with the present invention it is possible to carry out the fractionating step during the heating phase of the regeneration cycle and utilize the same heat source for both the heater and the fractionator. During the period when the heater is not operating and no hot regeneration gas is available, the valve V closes and no flow of liquid occurs to the fractionating tower.

The foregoing disclosure and description of the invention is illustrative and explanatory thereof, and various changes in the size, shape and materials as well as in the details of the illustrated construction may be made within the scope of the appended claims without departing from the spirit of the invention.

What I claim is:

1. In combination,
   a hydrocarbon recovery adsorption unit having a vessel containing a bed of adsorbent material wherein liquid fractions are extracted from a main gas stream in a noncontinuous cyclic manner and the bed is thereafter generated by directing a heated regeneration gas therethrough, said heated regeneration gas picking up said hydrocarbon liquid fractions which are subsequently removed therefrom as a liquid product,
   a stabilizer wherein said liquids are subjected to stabilization,
   heating means in the lower portion of said stabilizer,
   means diverting a portion of the heated regeneration gas during the period that said heated regeneration gas is circulating through the hydrocarbon liquid adsorption unit to the heating means of the stabilizer, whereby said stabilizer is operated intermittently and in accordance with the time periods when heated regeneration gas is available,
   a receiving vessel interposed between the hydrocarbon recovery adsorption unit and the stabilizer,
   a flow line extending from the adsorption unit to the inlet of said receiving vessel for conducting liquid products to said vessel,
   a conductor extending from the outlet of the receiving vessel to the stabilizer,
   a main control valve means in said conductor operable to permit or to completely shut off flow therethrough,
   operating means controlled by a condition which is related to the regeneration cycle of said hydrocarbon adsorption recovery unit which is independent of the liquid level in said receiving vessel for actuating said main control valve means, an adjustable rate controller valve also connected in said conductor at a point between said receiving vessel and said main control valve means, said rate controller valve maintaining a predetermined open position so long as the liquid level in the receiving vessel is between preselected maximum and minimum limits, means responsive to a predetermined maximum liquid level in the receiving vessel for actuating the rate controller valve to move the same toward a further open position, and additional means responsive to a predetermined minimum liquid level in the receiving vessel for actuating said rate controller valve to move the same toward a closed position.

2. The method of recovering hydrocarbon components from a gas stream including, adsorbing hydrocarbon fractions from a gas stream by directing the stream through a bed of adsorbent material, halting the flow through the bed after a predetermined time, thereafter directing a heated regeneration gas stream through the bed for a preselected period of time to remove the adsorbed fractions from the bed, subsequently condensing the fractions to recover hydrocarbon liquids, directing said liquids to a receiving area, diverting a portion of the heated regeneration gas stream to the fractionating zone to heat said zone during the intermittent time periods that regeneration gas is circulated through the bed, flowing liquid at a preselected rate from the receiving area to the fractionating zone only during the period that the zone is heated and when the liquid level in the receiving area is between maximum and minimum limits, increasing the rate of flow from the receiving area to the fractionating zone during a fractionating period and upon a predetermined rise in liquid level in the receiving area, and decreasing the rate of flow from the receiving area to the fractionating zone during a fractionating period upon a predetermined fall in the liquid level in the receiving area.

3. In combination, a hydrocarbon recovery adsorption unit having a vessel containing a bed of adsorbent material wherein liquid fractions are extracted from a main gas stream in an intermittent cyclic manner and the bed is thereafter regenerated by directing a heated regeneration gas therethrough, said regeneration gas picking up from the bed said hydrocarbon liquid fractions which are subsequently removed therefrom as a liquid product, a stabilizer wherein said liquids are subjected to stabilization, a receiving vessel interposed between the hydrocarbon recovery adsorption unit and the stabilizer, a flow line extending from the adsorption unit to the inlet of said receiving vessel for conducting liquid products to said vessel, a conductor extending from the outlet of the receiving vessel to the stabilizer, a main control valve means in said conductor operable to permit or to completely shut off flow therethrough, operating means controlled by a condition in said hydrocarbon adsorption recovery unit which is independent of the liquid level in said receiving vessel for actuating said main control valve means, an adjustable rate controller valve also connected in said conductor at a point between said receiving vessel and said main control valve means, said rate controller valve maintaining a predetermined open position so long as the liquid level in the receiving vessel is between preselected maximum and minimum limits, means responsive to a predetermined maximum liquid level in the receiving vessel for actuating the rate controller valve to move the same toward a further open position, additional means responsive to a predetermined minimum liquid level in the receiving vessel for actuating said rate controller valve to move the same toward a closed position, the condition in said hydrocarbon adsorption unit which controls the operating means for the main control valve means being the presence of a heated regeneration gas in the circuit of said unit, and means for diverting a portion of said heated regeneration gas to the stabilizer during the time that said heated regeneration gas is circulating within the adsorption unit, whereby the stabilizer is intermittently operated with its time period of operation being related to the time period that heated regeneration gas is circulated through said unit.

4. The combination as set forth in claim 3 wherein the means responsive to the maximum liquid level in the receiving vessel is a float mechanism having a float disposed within said receiving vessel and actuating means operably connecting the float to the rate controller valve, and also wherein the means responsive to the minimum liquid level in the receiving vessel is a float mechanism having a float disposed within said receiving vessel in spaced relation below the float of the maximum liquid level float mechanism, said float of the minimum liquid level float mechanism having operative connection with the rate controller valve.

5. The combination set forth in claim 3, wherein the volume of said receiving vessel is greater than the volume of liquid produced by said hydrocarbon adsorption unit during any one cycle of operation of said unit.

References Cited in the file of this patent

UNITED STATES PATENTS

| | | |
|---|---|---|
| 1,523,313 | Thompson | Jan. 13, 1925 |
| 1,594,915 | Weir | Aug. 3, 1926 |
| 2,104,310 | Roelfsema | Jan. 4, 1938 |
| 2,145,052 | Lund | Jan. 24, 1939 |
| 2,220,009 | Youker | Oct. 29, 1940 |
| 2,231,444 | Gerhold | Feb. 11, 1941 |
| 2,263,055 | Smith | Nov. 18, 1941 |
| 2,294,547 | Gerhold et al. | Sept. 1, 1942 |
| 2,367,862 | Gormly | Jan. 23, 1945 |
| 2,369,058 | Legatski | Feb. 6, 1945 |
| 2,456,398 | Gerhold | Dec. 14, 1948 |
| 2,476,280 | Bragg et al. | July 19, 1949 |
| 2,535,902 | Dailey | Dec. 26, 1950 |
| 2,665,769 | Walker et al. | Jan. 12, 1954 |
| 2,674,563 | Findlay | Apr. 6, 1954 |
| 2,695,029 | Bruegger | Nov. 23, 1954 |
| 2,768,118 | Laurence et al. | Oct. 23, 1956 |
| 2,790,505 | Dow | Apr. 30, 1957 |
| 2,848,186 | Boyer | Aug. 19, 1958 |
| 2,874,924 | Good | Feb. 24, 1959 |
| 2,882,995 | Smith | Apr. 21, 1959 |
| 2,938,380 | Smith et al. | May 31, 1960 |